United States Patent
Segal

(10) Patent No.: US 8,783,557 B2
(45) Date of Patent: Jul. 22, 2014

(54) SYSTEM AND METHOD FOR INTERACTIVE MOBILE GAMING

(71) Applicant: Retoy, LLC, White Plains, NY (US)

(72) Inventor: Edo Segal, New York, NY (US)

(73) Assignee: Retoy, LLC, New York, NY (US)

( * ) Notice: Subject to any disclaimer, the term of this patent is extended or adjusted under 35 U.S.C. 154(b) by 0 days.

(21) Appl. No.: 14/060,163

(22) Filed: Oct. 22, 2013

(65) Prior Publication Data

US 2014/0110470 A1 Apr. 24, 2014

Related U.S. Application Data

(60) Provisional application No. 61/716,684, filed on Oct. 22, 2012, provisional application No. 61/736,337, filed on Dec. 12, 2012, provisional application No. 61/750,300, filed on Jan. 8, 2013, provisional application No. 61/758,904, filed on Jan. 31, 2013, provisional application No. 61/763,372, filed on Feb. 11, 2013, provisional application No. 61/763,696, filed on Feb. 12, 2013.

(51) Int. Cl.
*G06F 17/00* (2006.01)
*G06K 19/06* (2006.01)
*G06F 17/30* (2006.01)

(52) U.S. Cl.
CPC .......... *G06K 19/06046* (2013.01); *G06K 19/06* (2013.01); *G06F 17/30* (2013.01)
USPC ........................................................ 235/375

(58) Field of Classification Search
CPC . G07F 17/32; G07F 17/3202; G07F 17/3216; G07F 17/3218; G07F 17/3223
USPC ........................ 235/375, 376, 462.01; 463/29; 273/288–290
See application file for complete search history.

(56) References Cited

U.S. PATENT DOCUMENTS

| | | | |
|---|---|---|---|
| 7,862,428 B2 * | 1/2011 | Borge | 463/29 |
| 2003/0001016 A1 | 1/2003 | Fraier et al. | |
| 2004/0051245 A1 * | 3/2004 | Weisman et al. | 273/262 |
| 2008/0153594 A1 | 6/2008 | Zheng | |
| 2008/0319252 A1 | 12/2008 | Chapman et al. | |

OTHER PUBLICATIONS

Nabor obiektivov dlya IPhone rasshiryaet vozmozhnosti kamery mobilnogo telefona. Fainaidea, No. 27, 2011 [online][retrieved on Feb. 20, 2014]. Retrieved from the Internet: <URL:http://www.fainaidea.com/archives/4903>.

Holga iPhone Lens. The iPhoneographer, Mar. 14, 2012 [online][retrieved on Feb. 20, 2014]. Retrieved from the Internet: <URL: http://www.theiphoneobrapher.co.uk/2012_03_01_archive.html>.

* cited by examiner

*Primary Examiner* — Seung Lee
(74) *Attorney, Agent, or Firm* — Leason Ellis LLP

(57) ABSTRACT

Disclosed is a method and apparatus for providing information to a camera associated with a computing device. The apparatus includes a base portion having a bottomside. The base portion further has an interior region disposed therein, that provides an illuminable surface. Further, a machine-readable code is included that is supported by the surface, and a lens is disposed between the code and the bottomside. The base is configured to seat the lens over the camera associated with the computing device in a first orientation and a second orientation. Further, the machine-readable code presents, for reading by the computing device, first information in response to the lens being seated over the camera in the first orientation and second information in response to the lens being seated over the camera in the second orientation, respectively.

22 Claims, 20 Drawing Sheets

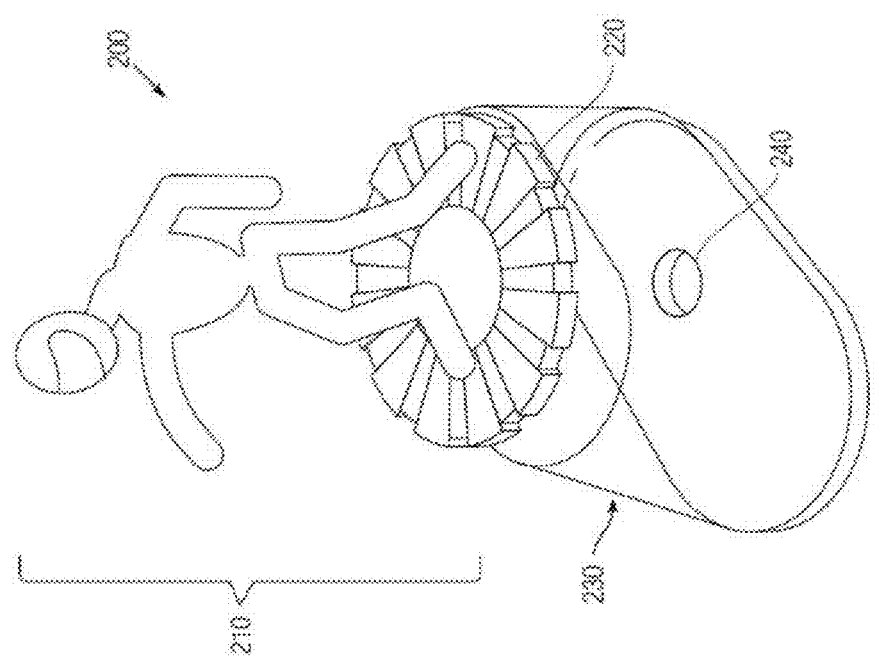

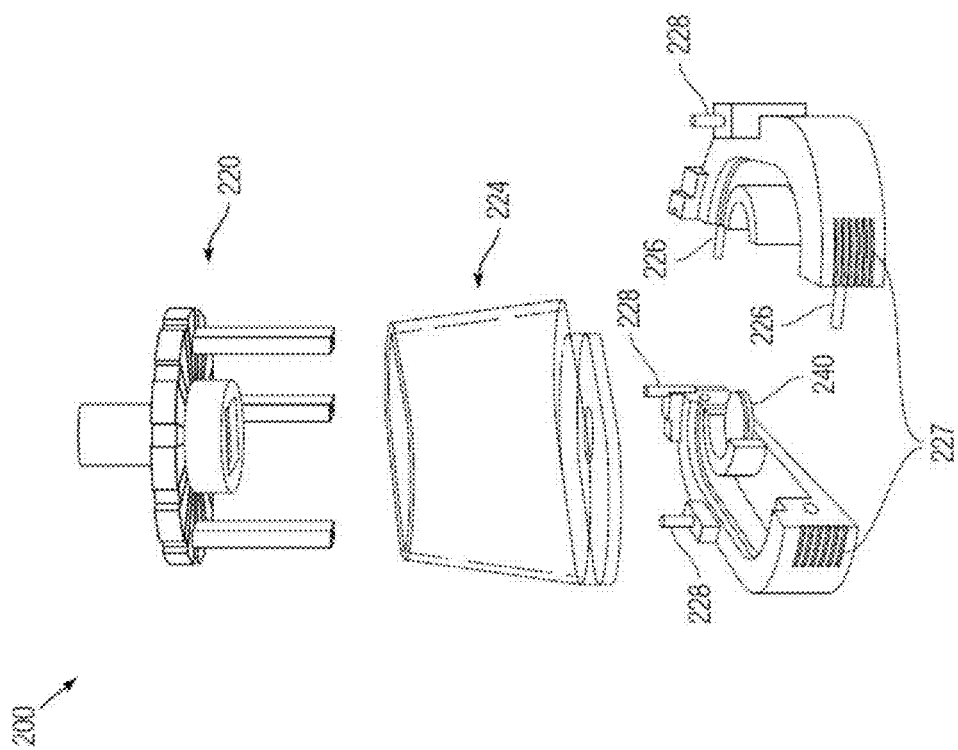

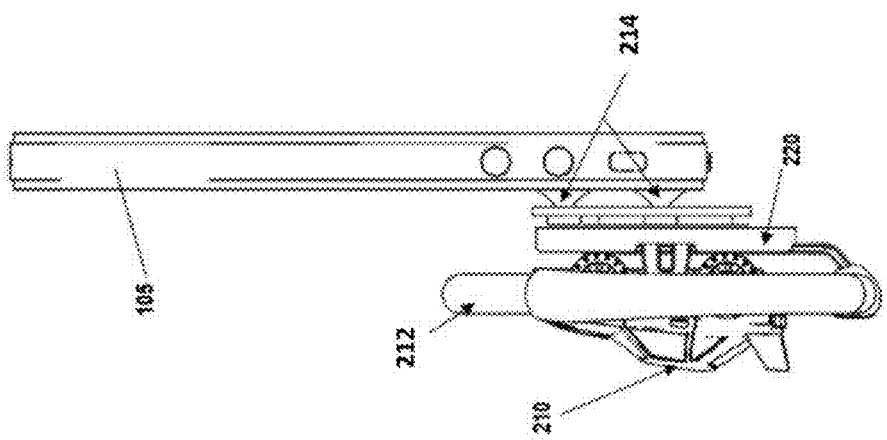

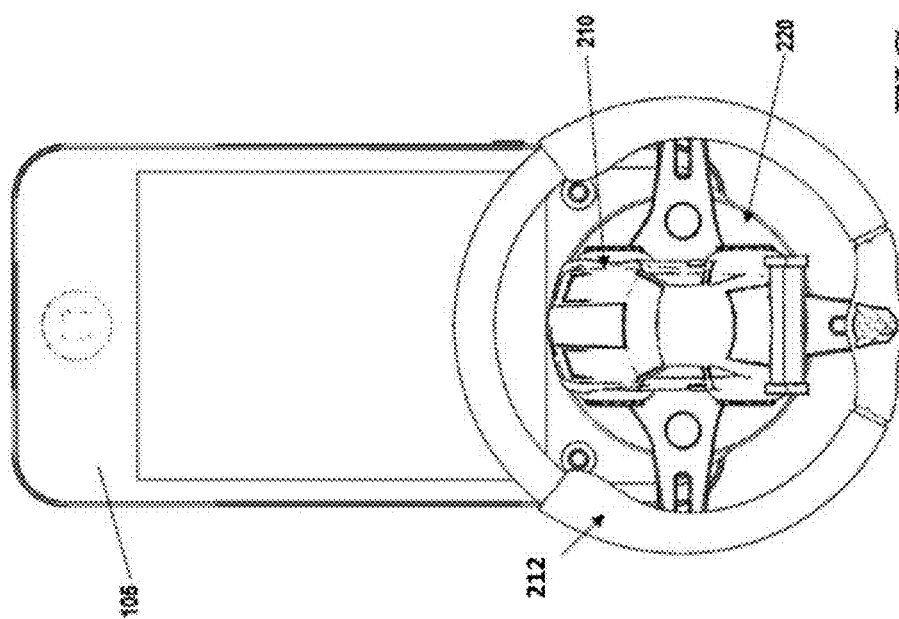

SYSTEM AND METHOD FOR INTERACTIVE MOBILE GAMING

CROSS-REFERENCE TO RELATED APPLICATIONS

The present application is based on and claims priority to the following patent applications: U.S. Provisional Patent Application Ser. No. 61/716,684, filed Oct. 22, 2012; U.S. Provisional Patent Application Ser. No. 61/736,337, filed Dec. 12, 2012; U.S. Provisional Patent Application Ser. No. 61/750,300, filed on Jan. 8, 2013; U.S. Provisional Patent Application Ser. No. 61/758,904, filed on Jan. 31, 2013; U.S. Provisional Patent Application Ser. No. 61/763,372, filed on Feb. 11, 2013; and U.S. Provisional Patent Application Ser. No. 61/763,696, filed on Feb. 12, 2013, the contents of all of which are hereby incorporated by reference in their respective entireties.

BACKGROUND

The increasing proliferation of mobile computing devices, such as smartphones, has resulted in users increasingly relying on such devices for recreational purposes, including for game playing. Accordingly, many electronic video games such as multi-player video games have overtaken traditional "physical" games, such as board games, in popularity. While electronic video games may provide many advantages over board games, such video games do not provide the same tangible, 'real world' gameplay experience, as reflected in certain board games through the use of figurines or gameplay pieces.

The present application addresses these and other considerations.

SUMMARY OF THE INVENTION

Described herein, in certain implementations, are figurines and various other items that incorporate or otherwise are used in conjunction with one or more optics (such as a lens) and an integrated code (such as a QR code or barcode). Such optics can be oriented such that the integrated code is viewable through the optics, such as by an imaging device (e.g., a camera).

In accordance with one or more implementations, disclosed are a method and apparatus for providing information to a camera associated with a computing device. The apparatus includes a base portion having a bottomside. The base portion further has an interior region disposed therein that provides an illuminable surface. Further, a machine-readable code is included that is supported by the surface, and a lens is disposed between the code and the bottomside. The base is configured to seat the lens over the camera associated with the computing device in a first orientation and a second orientation. Further, the machine-readable code presents, for reading by the computing device, first information in response to the lens being seated over the camera in the first orientation and second information in response to the lens being seated over the camera in the second orientation, respectively.

Also described herein are various systems and methods which include operations such as perceiving one or more codes, processing such code(s) to determine one or more instructions, correlating one or more instructions, and providing one or more gameplay modifications based on a correlation of one or more instructions with one or more concurrent gameplay events.

These and other aspects, features, and advantages can be appreciated from the accompanying description of certain embodiments of the invention and the accompanying drawing figures and claims.

BRIEF DESCRIPTION OF THE DRAWINGS

FIG. 2A depicts an example apparatus that is configured as an integrated gaming piece, in accordance with an implementation of the present application;

FIGS. 3A and 3B illustrate exploded views of example apparatuses in accordance with alternative implementations of the present application;

FIGS. 5B-5D depict various aspects of implementations of the present application that support rotation of code;

DETAILED DESCRIPTION OF CERTAIN EMBODIMENTS OF THE INVENTION

Figure 1:
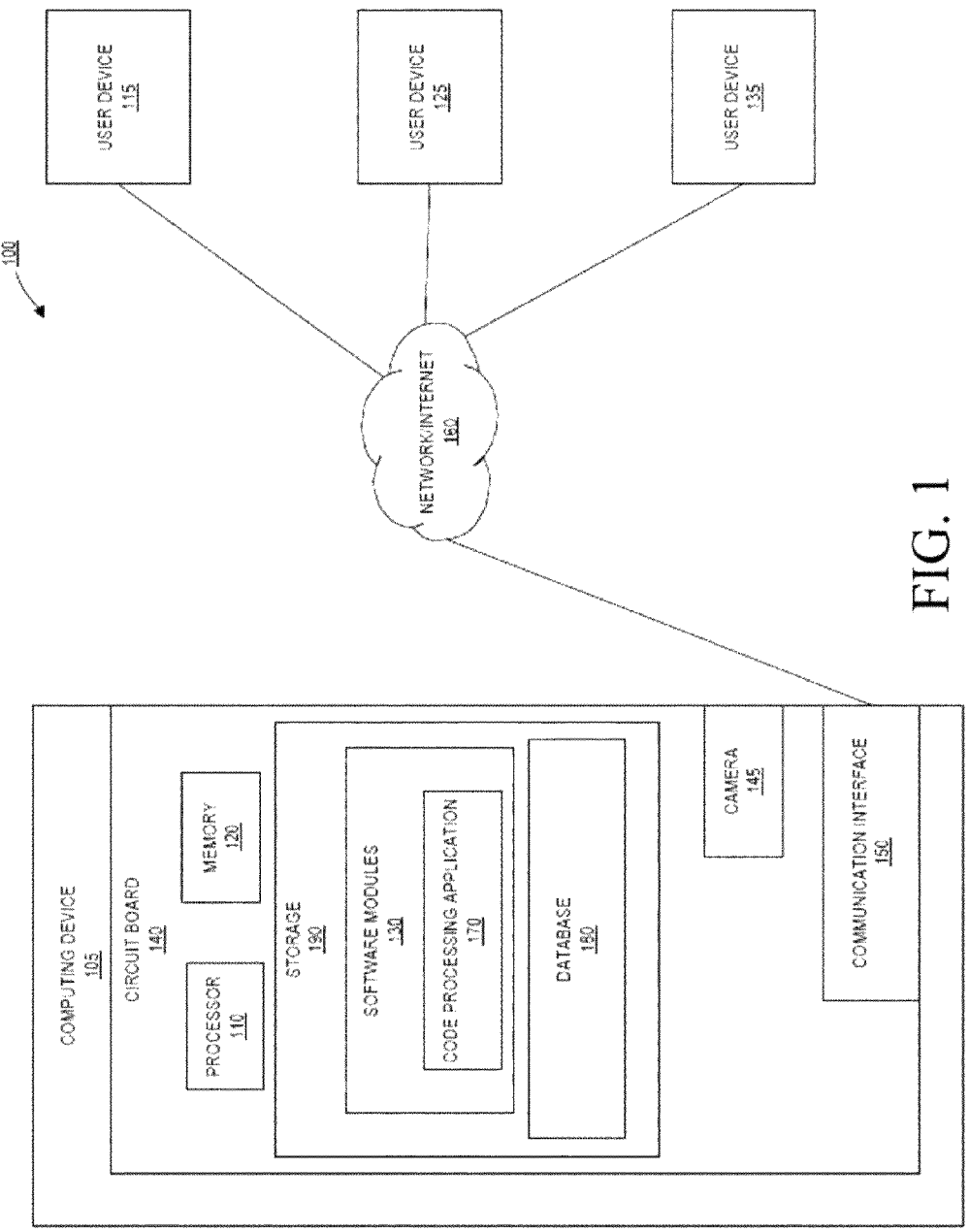
FIG. 1 is a high-level diagram illustrating an exemplary configuration of a code processing system in accordance with one or more implementations of the present application.

Various implementations of the present application include devices which can incorporate one or more optics (such as lens(es)) and an integrated code, such as a QR code or barcode. Such optics can be oriented such that the integrated code is viewable through the optics, for example, by an imaging device (e.g., a camera) that may operate with and/or be coupled with a computing device. In one or more implementations of the present application an item, such as a figurine, is provided that is included with the integrated or embedded code such as a QR code or barcode, to form a gamepiece. The position and/or orientation of the game piece can affect how the code is viewed. For example, the lens(es) can distort or magnify a pattern, thereby resulting in different interpretations of the code. A first instruction can be generated when viewed at a first orientation and/or through a lens, and a second instruction can be generated when viewed at a second orientation and/or through a second lens. The first and second instructions can be different.

The application can further relate to one or more figurines that incorporate or used in conjunction with one or more optics. In addition or in the alternative, in one or more implementations a figurine provided in accordance with the present application is configured to include a base or platform having a signal projector. In such implementations, the optics can be oriented such that patterns projected by the projector are viewable through the optics, such as by a camera. Operations can include identifying the patterns, processing them to determine one or more instructions, correlating instructions and providing one or more gameplay modifications based thereon.

In one or more implementations, a base portion is configured with a bottomside and an interior region disposed within the base portion. The interior region can provide an illuminable surface that receives light from exterior of the base portion. The machine-readable code can be supported by the surface, and the optics (e.g., one or more the lens(es)) can be disposed between the code and the bottomside of the base portion. The base can be configured to seat the lens over a camera in a first orientation and a second orientation. The machine-readable code presents for reading by the computing device first information in response to the lens being seated over the camera in the first orientation and second information in response to the lens being seated over the camera in the second orientation, respectively.

In one or more implementations, the optics (e.g., lens(es)) are removable and interchangeable with the base portion. Alternatively, a plurality of lenses are configured within the base portion.

The platform or base portion of an apparatus in accordance with the present application can be configured to be translucent and can be provided with multiple and possibly changing colors or textures. Light passing through the platform can improve the capability of the projector, and the light can be viewed by the optics (e.g., a camera lens) through a non-optical hole or cavity. Moreover, a lens can be embedded at or near the bottomside of the platform.

In operation, signals (that may be projected, reflected or otherwise provided) can be perceived to represent discrete informational elements and with respect to a particular lens and/or lens orientation through which the signals are viewed. For example, a signal viewed through a lens can represent a first instruction, and the signal viewed through a second lens can represent a second instruction. Lenses can be formed to be concave or convex, and can distort or magnify a pattern, thereby resulting in different interpretations of single signal. In operation, the different interpretations can result in respective instructions being executed. In one or more implementations, instructions can relate to game instructions, game characteristics, and/or player abilities. For example, instructions can include substituting one character being played for another. Moreover, the characters can have different playing attributes, thereby resulting in different outcomes.

In one or more implementations, a figurine that is provided in accordance with the present application can be coupled with or to a mobile computing device, such as a smartphone, tablet, personal digital assistant, or other device. The figurine can be attached or fixed by a clip, suction cup or some other means (including simply placed) to couple the figurine to the mobile computing device. In this way, for example, the code, including a signal projector (if so configured) can remain in view of a camera associated or provided with the mobile computing device. In one or more implementations, the figurine can be activated by pushing down or positioning the figurine in a particular way.

While many of the implementations and examples shown and described herein relate to use of different lenses, the invention is not so limited. For example, construction parameters can be used to affect how and which of a plurality of patterns are perceived by a camera or other optics. The base or platform associated with the figurine can be constructed of material having varying degrees of translucency and/or different colors, which can impact operations. For example, a pattern with red is interpreted as one instruction, while the identical pattern with blue is interpreted as another, different instruction. Also, particular instructions can be provided, such as to "attack" or "fire" or make a selection of a particular weapon. Furthermore, the game piece can be moved, rotated, or positioned in various ways, which can correspond to activation of the particular game activity. One or more patterns can be configured or calibrated as a function of the position and/or orientation of the game piece. Thus, the system supports various gestures and movements.

In one or more implementations, communication protocols such as Wi-Fi, Bluetooth, near field communication (NFC), or other suitable protocol can be employed for use with one or more components. Proximity can be determined as a function of the protocol, which can be used to assign one or more commands or instructions to be issued, such as in connection with a game. For example, an instruction to attack from the left or right can be issued, depending upon the position the game piece. In addition to instructions being executed in connection with play (e.g., shoot, attack, run, jump, or the like), interaction with one or more processors can also affect other factors of a game, such as relating to a change in the status or health of a player (e.g., after being hit, shot or the like). Other interaction can represent a correlation with one or more particular user accounts, such as user profile information in multi-user game networks. Such profile information can further indicate that a user is required to be authenticated prior to participating in a game.

In one or more implementations, an apparatus configured with a figurine is seated over a camera associated with the computing device, and a character associated with the figurine may "enter" a game being played on the computing device. Thereafter, the apparatus may be removed without interrupting gameplay. Alternatively, the apparatus remains positioned over the camera for gameplay to continue.

Moreover, in one or more implementations a plurality of machine-readable codes may be provided in a single apparatus, for example, that present respective instructions. For example, a toy figurine oriented to provide information associated with a first machine-readable code may enable a first operational play mode, while information associated with a second machine-readable code may enable a second operational play mode.

In addition to gaming, the present application is useful in one or more industries, and respective figurines including lenses and parameters, are usable in connection with executing instructions that can be issued as a function thereof. For example, a doctor, nurse, pharmacist, representative of an insurance company or other industry, can provide an item configured with a pattern to a user (patient). After a user is verified or authenticated via the item, access to confidential information can be provided.

Accordingly, described herein are systems and methods for processing codes into instructions. The referenced systems and methods are now described more fully with reference to the accompanying drawings, in which like reference numerals refer to like elements and in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods. Aspects of the present systems and methods can take the form of an entirely hardware embodiment, an entirely software embodiment (including firmware, resident software, micro-code, etc.), or an embodiment combining software and hardware. One of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer. Furthermore, the terms and phrases used herein are not intended to be limiting, but rather are to provide an understandable description of the systems and methods.

An exemplary computer system is shown as a block diagram in FIG. 1 which is a high-level diagram illustrating an exemplary configuration of a code processing system 100. Computing device 105 can be a personal computer or server, or can be a mobile computing device, such as a tablet computer, a laptop computer, a smartphone or other suitable computing device. Thus, it is to be understood that computing device 105 of code processing system 100 can be practically any computing device and/or data processing apparatus capable of embodying the systems and/or methods described herein.

Computing device 105 of code processing system 100 can include a circuit board 140, such as a motherboard, which is operatively connected to various hardware and software components that serve to enable operation of the code processing system 100. The circuit board 140 can be operatively connected to a processor 110 and a memory 120. Processor 110 serves to execute instructions for software that can be loaded into memory 120. Processor 110 can be a number of processors, a multi-processor core, or some other type of processor, depending on the particular implementation. Further, processor 110 can be implemented using a number of heterogeneous processor systems in which a main processor is present with secondary processors on a single chip. As another illustrative example, processor 110 can be a symmetric multi-processor system containing multiple processors of the same type.

Preferably, memory 120 and/or storage 190 are accessible by processor 110, thereby enabling processor 110 to receive and execute instructions stored on memory 120 and/or on storage 190. Memory 120 can be, for example, a random access memory (RAM) or any other suitable volatile or non-volatile computer readable storage medium. In addition, memory 120 can be fixed or removable. Storage 190 can take various forms, depending on the particular implementation. For example, storage 190 can contain one or more components or devices such as a hard drive, a flash memory, a rewritable optical disk, a rewritable magnetic tape, or some combination of the above. Storage 190 also can be fixed or removable.

One or more software modules 130 are encoded in storage 190 and/or in memory 120. The software modules 130 can comprise one or more software programs or applications having computer program code or a set of instructions executed in processor 110. Such computer program code or instructions for carrying out operations for aspects of the systems and methods disclosed herein can be written in any combination of one or more programming languages, including an object oriented programming language such as Java, Smalltalk, C++, Python, and JavaScript or the like and conventional procedural programming languages, such as the "C" programming language or similar programming languages. The program code can execute entirely on computing device 105, partly on computing device 105, as a stand-alone software package, partly on computing device 105 and partly on a remote computer/device, or entirely on the remote computer/device or server. In the latter scenario, the remote computer can be connected to computing device 105 through any type of network, including a local area network (LAN) or a wide area network (WAN), or the connection can be made to an external computer (for example, through the Internet 160 using an Internet Service Provider).

One or more software modules 130, including program code/instructions, are located in a functional form on one or more computer readable storage devices (such as memory 120 and/or storage 190) that can be selectively removable. The software modules 130 can be loaded onto or transferred to computing device 105 for execution by processor 110. It can also be said that the program code of software modules 130 and one or more computer readable storage devices (such as memory 120 and/or storage 190) form a computer program product that can be manufactured and/or distributed in accordance with the present invention, as is known to those of ordinary skill in the art.

It is to be understood that, in some illustrative embodiments, one or more of software modules 130 can be downloaded over a network to storage 190 from another device or system via communication interface 150 for use within code processing system 100. For instance, program code stored in a computer readable storage device in a server can be downloaded over a network from the server to code processing system 100.

Moreover, the software modules 130 can include a code processing application 170 that is executed by processor 110. During execution of the software modules 130, and specifically the code processing application 170, the processor 110 configures the circuit board 140 to perform various operations relating to code processing with computing device 105, as will be described in greater detail below.

Furthermore, it is to be understood that while software modules 130 and/or code processing application 170 can be embodied in any number of computer executable formats, in certain implementations software modules 130 and/or code processing application 170 comprise one or more applications that are configured to be executed at computing device 105 in conjunction with one or more applications or 'apps' executing at remote devices, such as computing device(s) 115, 125, and/or 135 and/or one or more viewers such as internet browsers and/or proprietary applications. Furthermore, in certain implementations, software modules 130 and/or code processing application 170 can be configured to execute at the request or selection of a user of one of computing devices 115, 125, and/or 135 (or any other such user having the ability to execute a program in relation to computing device 105, such as a network administrator), while in other implementations computing device 105 can be configured to automatically execute software modules 130 and/or code processing application 170, without requiring an affirmative request to execute. It should also be noted that while FIG. 1 depicts memory 120 oriented on circuit board 140, in an alternate arrangement, memory 120 can be operatively connected to the circuit board 140. In addition, it should be noted that other information and/or data relevant to the operation of the present systems and methods (such as database 180) can also be stored on storage 190, as will be discussed in greater detail below.

Continuing with reference to FIG. 1, storage 190 can store database 180. As described in greater detail below, database 180 can contain and/or maintain various data items and elements that are utilized throughout the various operations of code processing system 100. Although database 180 is depicted in FIG. 1 as being configured locally to computing device 105, in certain implementations database 180 and/or various of the data elements stored therein can be located remotely (such as on a remote device or server—not shown) and connected to computing device 105 through network 160, in a manner known to those of ordinary skill in the art.

As referenced above, it should be noted that in certain implementations, such as the one depicted in FIG. 1, various ones of the computing devices 115, 125, 135 can be in periodic or ongoing communication with computing device 105 through a computer network, such as the Internet 160. Moreover and in certain other implementations, computing devices 115, 125, and/or 135 can be in periodic or ongoing direct communication with computing device 105, such as through communications interface 150, such as during an interactive multiplayer game (not shown).

Continuing with reference to FIG. 1, communication interface 150 is illustrated as also operatively connected to circuit board 140. Communication interface 150 can be any interface that enables communication between the computing device 105 and external devices, machines and/or elements. Preferably, communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting computing device 105 to other computing devices and/or communication networks such as private networks and the Internet. Such connections can include a wired connection or a wireless connection (e.g. using the 802.11 standard) though it should be understood that communication interface 150 can be practically any interface that enables communication to/from the circuit board 140.

At various points during the operation of code processing system 100, computing device 105 can communicate with one or more computing devices, for example, those controlled and/or maintained by one or more individuals and/or entities, such as user devices 115, 125, and/or 135, such as during a multiplayer game. Such computing devices can transmit and/or receive data to/from computing device 105, thereby initiating maintaining, and/or enhancing the operation of the code processing system 100. The computing devices 115-135 can be in direct communication with computing device 105, indirect communication with computing device 105, and/or can be communicatively coordinated with computing device 105. While such computing devices can be practically any device capable of communication with computing device 105, in certain embodiments various of the computing devices are servers, while other computing devices are user devices (e.g., personal computers, handheld/portable computers, smartphones, etc.) and, thus, that practically any computing device that is capable of transmitting and/or receiving data to/from computing device 105 can be suitable.

Moreover, while FIG. 1 depicts code processing system 100 with respect to computing devices 115, 125, and 135, virtually any number of computing devices can interact with the code processing system 100 in a manner described herein. It should be further understood that a substantial number of operations shown and described herein can be initiated by and/or performed in relation to such computing devices. For example, as referenced above, such computing devices can execute applications and/or viewers that request and/or receive data from computing device 105, substantially in the manner described in detail herein.

The present application includes certain embodiments and/or arrangements reference to acts and symbolic representations of operations that are performed by one or more devices, such as shown and described in the code processing system 100 of FIG. 1. Such acts and operations, which are at times referred to as being computer-executed or computer-implemented, can include manipulation by the processor 110 of electrical signals representing data in a structured form. This manipulation transforms the data and/or maintains them at locations in the memory system of the computer (such as memory 120 and/or storage 190), which can reconfigure and/or otherwise alter the operation of the system in a manner understood by those skilled in the art. The data structures in which data are maintained can be physical locations of the memory that have particular properties defined by the format of the data. Of course, one skilled in the art will recognize that this not meant to provide architectural limitations to the manner in which different embodiments can be implemented. The different illustrative embodiments can be implemented in a system including components in addition to or in place of those illustrated for the code processing system 100. Other components shown in FIG. 1 can be varied from the illustrative examples shown. The different embodiments can be implemented using any suitable hardware device or system capable of running program code. In another illustrative example, code processing system 100 can take the form of a hardware unit that has circuits that are manufactured or configured for a particular use. This type of hardware can perform operations without requiring program code to be loaded into a memory from a computer readable storage device to be configured to perform the operations.

For example, computing device 105 can take the form of a circuit system, an application specific integrated circuit (ASIC), a programmable logic device, or some other suitable type of hardware configured to perform a number of operations. With a programmable logic device, the device is configured to perform the number of operations. The device can be reconfigured at a later time or can be permanently configured to perform the number of operations. Examples of programmable logic devices include, for example, a programmable logic array, programmable array logic, a field programmable logic array, a field programmable gate array, and other suitable hardware devices. With this type of implementation, software modules 130 can be omitted because the processes for the different embodiments are implemented in a hardware unit.

In still another illustrative example, computing device 105 can be implemented using a combination of processors found in computers and hardware units. Processor 110 can have a number of hardware units and a number of processors that are configured to execute software modules 130. In this example, some of the processors can be implemented in the number of hardware units, while other processors can be implemented in the number of processors.

In another example, a bus system can be implemented and can be comprised of one or more buses, such as a system bus or an input/output bus. Of course, the bus system can be implemented using any suitable type of architecture that provides for a transfer of data between different components or devices attached to the bus system. Additionally, communications interface 150 can include one or more devices used to transmit and receive data, such as a modem or a network adapter.

Embodiments and/or arrangements can be described in a general context of computer-executable instructions, such as program modules, being executed by a computer. Generally, program modules include routines, programs, objects, components, data structures, etc., that perform particular tasks or implement particular abstract data types. While the various computing devices and machines referenced herein, including but not limited to computing device 105, computing devices 115, 125, and 135, are referred to herein as individual/single devices and/or machines, in certain implementations the referenced devices and machines and their associated and/or accompanying operations, features, and/or functionalities can be arranged or otherwise employed across any number of devices and/or machines, such as over a network connection.

Furthermore and although not all illustrated in FIG. 1, various additional components can be incorporated within and/or employed in conjunction with computing device 105. For example, computing device 105 can include an embedded and/or peripheral image capture device such as a camera 145 and/or an embedded and/or peripheral audio capture device such as a microphone.

The operation of the code processing system 100 and the various elements and components described above will be further appreciated with reference to the method for code processing as described herein.

FIG. 2A depicts an example apparatus 200 that is configured as an integrated gaming piece, in accordance with an implementation of the present application. The integrated gaming piece shown in FIG. 2A includes a figurine 210 which, in certain implementations, resembles or otherwise corresponds to a character or role in a game, such as a 'real world' game (e.g., a board game) and/or a 'virtual' game (e.g., a video game such as a multi-player video game). In the implementation shown in FIG. 2A, the figurine 210 is attached or otherwise oriented to a base 220. The underside of base 220 can include a code 225 (as shown, for example, in FIG. 2E), which can be a unique QR code or bar code or any other such code that can provide identifying or associated information, as is known to those of ordinary skill in the art.

Moreover, in certain implementations a code 225 can be embedded or otherwise affixed to the underside of figurine 210 (not shown). In such implementations, base 220 and/or platform 230 can be configured with either a hole and/or a lens oriented at the top of the base/platform, such that the code 225 can be viewable through lens 240, such as in the manner shown and described in greater detail herein. Moreover, various figurines 210 can be shaped in various ways (such as respective miniature race cars) with each having a unique code 225 embedded or affixed to their respective undersides. For example, two figurines 210 shaped as race cars can be configured with respective codes that correspond to each particular type of car. In operation, when the figurine 210 is oriented atop base 220, the code 225 can be perceived, such as through a lens 240 and/or by an integrated camera of device 105. Figurine 210 and base 220 can be further attached or otherwise oriented to a platform 230, such as in the manner depicted in FIG. 2A.

Figure 2B:
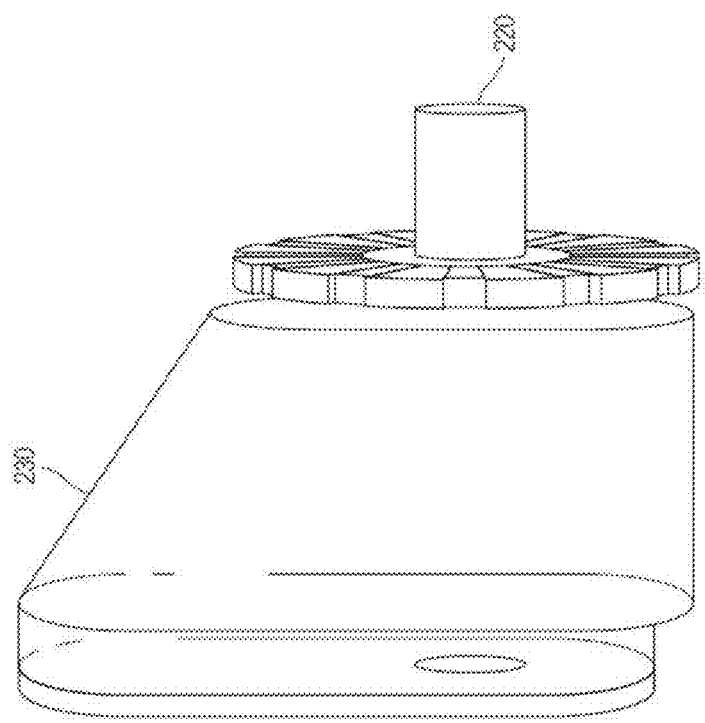
FIG. 2B depicts a side view of a platform and a base of an integrated gaming piece, in accordance with an implementation of the present application.

FIG. 2B depicts a side view showing the arrangement of base 220 on platform 230. In certain implementations, at least a section of platform 230 can be translucent to varying degrees. Moreover, in certain implementations various aspects of platform 230, such as the color or optical texture of the platform incorporating, for example, different colors and/or textures which, in turn, can affect the manner in which code 225 is perceived.

Figure 2C:
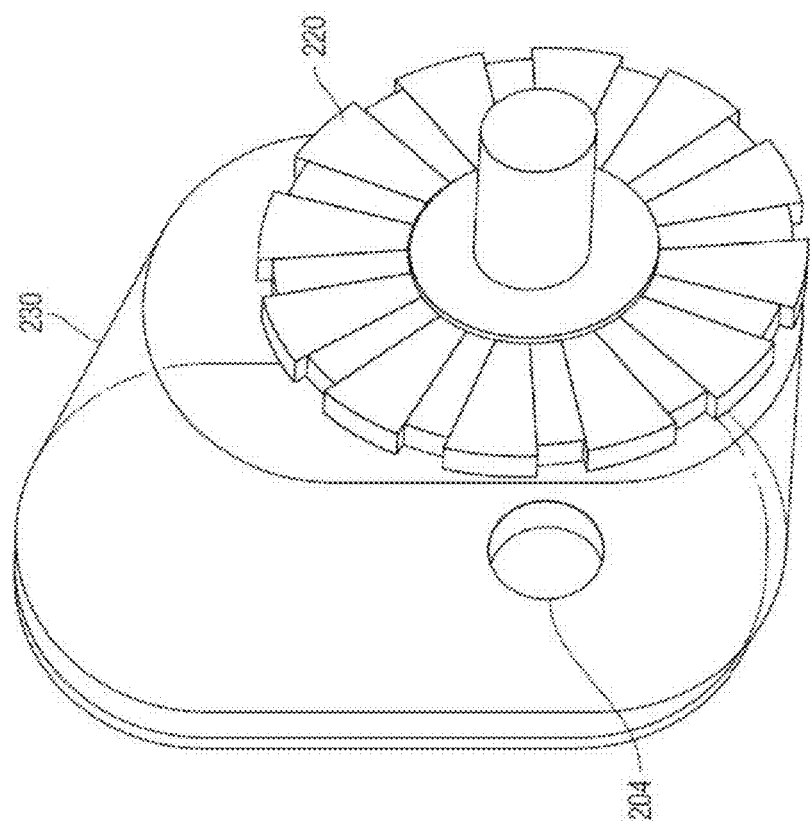
FIG. 2C depicts a perspective view of an integrated gaming piece, in accordance with an implementation of the present application.

FIG. 2C depicts a perspective view of platform 230 having base 220 oriented thereupon. It can be appreciated with reference to FIG. 2C that an optic such as lens 240 can be embedded at the bottomside of platform 230, opposite the underside and placement of code 225. Platform 230 can be translucent in varying degrees, and light passing through the platform 230 improves the viewability of code 225, when viewed (such as by a camera) through lens 240. While lens 240 is described herein with reference to an optical lens, in certain implementations lens 240 can be substituted for a non-optical hole or cavity.

Figure 2D:
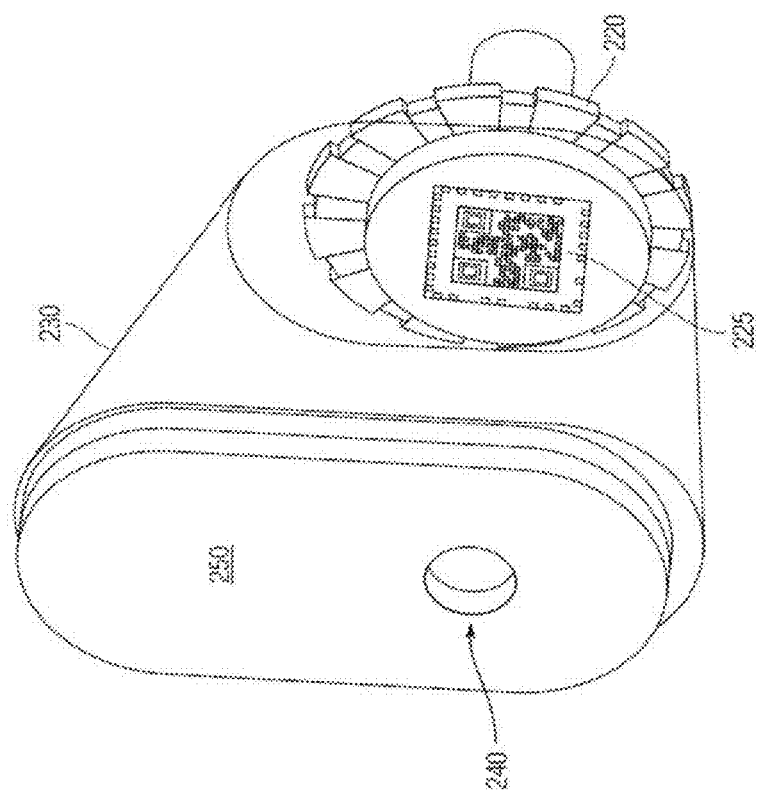
FIG. 2D depicts a view of a platform, showing the positioning of code with respect to the platform and lens, in accordance with an implementation of the present application.

FIG. 2D depicts another view of platform 230, showing the positioning of code 225 (here, a QR code) with respect to the platform and lens 240. As noted above, code 225 can be oriented such that the code is viewable through lens 240. Moreover, platform 230 can be constructed from translucent material such that sufficient light can pass through the platform and enable the code 225 to be viewable through lens 240. Moreover, in certain implementations code 225 can be configured such that the code can be perceived as representing discrete informational elements (e.g., instructions) based upon the lens through which the code is viewed. Thus, for example, the same code 225 when viewed through one lens (e.g., a concave lens) can provide a first instruction, and when viewed through another lens (e.g., a convex lens) can provide a second instruction. Such lenses can be swapped, for example by replacing bottom 250 of platform 230, with different bottoms having different lenses 240, for example, a concave lens, a convex lens, or other sized and shaped lens.

Accordingly, a single code, when viewed through different lenses, can provide different informational elements (e.g., gaming instructions, gaming characteristics, abilities, or the like). By way of illustration, a particular code 225 can provide an 'attack' command, and the particular manner in which such a command (i.e., the code) is perceived (for example, through different lenses) can dictate a particular aspect in which such a command should be implemented (e.g., different lenses can correspond to different weapons). Various bases 220, each of which can hold/contain one or more lenses 240, can be configured such that different bases can cause each particular code 225 that can be affixed, for example, on the underside of car figurine 210, to be perceived in different ways. For example, one base 220 can have a lens that can cause one type of distortion to the perception of the code 225, and such a perception can be perceived by an integrated camera of device 105 and, thereafter, processed to correspond to one feature (e.g., increased speed ability with respect to a car in a video racing game). Alternatively, another base can have a lens that causes another type of distortion and an alternative perception of the code, and such alternative perception can be processed to correspond to another different feature (e.g., an increased handling ability).

Figure 3B:
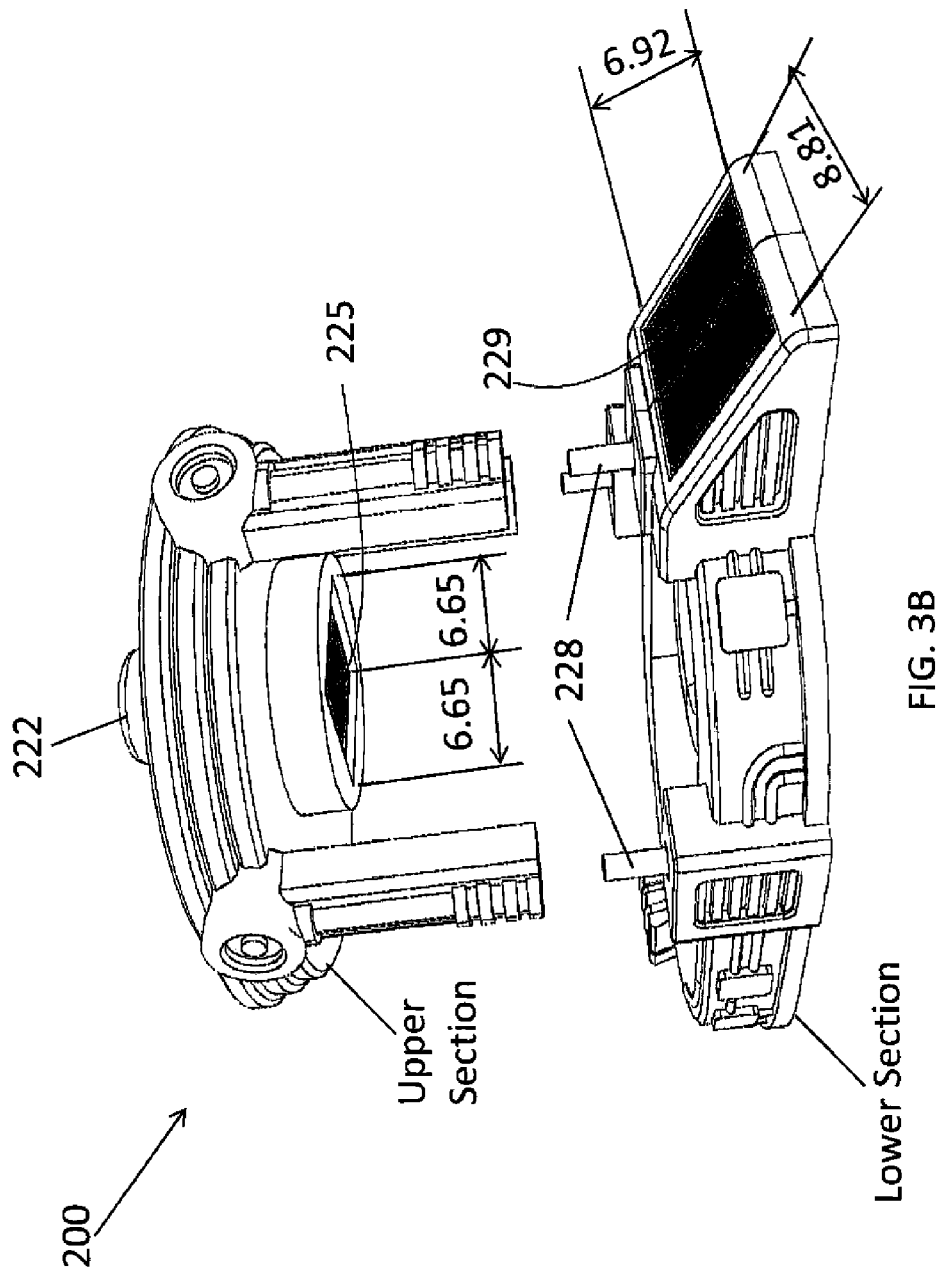

FIGS. 3A and 3B illustrate exploded views of example apparatuses 200 in accordance with alternative implementations of the present application. With reference to FIG. 3A, a figurine 210 (not shown) can be attached or otherwise oriented to a base 220 via a figurine pin-mount 222 or other suitable coupling member. The example base 220 shown in FIG. 3A is configured as an upper section of apparatus 200. As illustrated in FIG. 3A, the underside of the upper section of base 220 can include a code 225 (not shown) which can be a unique QR code or barcode or any other such code that can provide identifying or associated information. In addition to base 220, clear "tube" section 224 is provided that is configured to be positioned between the upper and lower section of base 220. In the example apparatus 200 shown in FIG. 3A, lower section is configured with horizontal pins 226 for connecting two lower halves of base 200. Further, vertical pins 228 are provided in the example apparatus 200 shown in FIG. 3A for connecting lower section of the base 220 to the upper section of the base 200. Further, lens 240 is positioned within the lower section of base 220, and can be received between the two lower sections of base 220.

With reference to FIG. 3B, an alternative apparatus 200 is displayed in which a figurine 210 (not shown) can be attached or otherwise oriented to a base 220 via a figurine pin-mount 222 or other suitable coupling member. As with the example shown in FIG. 3A, the example base 220 shown in FIG. 3B is configured as an upper section of apparatus 200. As illustrated in FIG. 3B, the underside of the upper section of base 220 can include a code 225 which can be a unique QR code or barcode or any other such code that can provide identifying or associated information. In addition to base 220, clear "tube" section 224 (not shown) can be provided that is configured to be positioned between the upper and lower section of base 220. Moreover, nose cone section 227 is provided for directional assistance, for example, while engaged with computing device 105. Further, vertical pins 228 are provided in the example apparatus 200 shown in FIG. 3B for connecting lower section of the base 220 to the upper section of the base 200. Further, lens 240 (not shown) is positioned within the lower section of base 220, and can be received between the two lower sections of base 220. Moreover, the example apparatus 200 illustrated in FIG. 3B includes graphics area 229, which can be usable for displaying graphical or other content.

Figure 4:
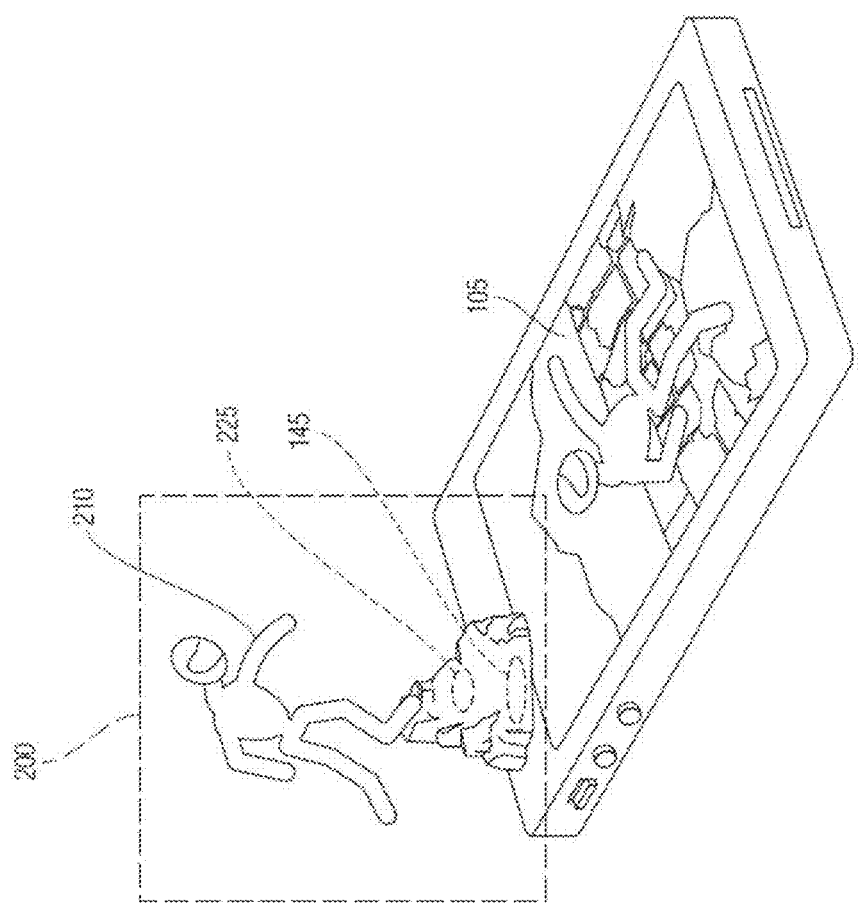
FIG. 4 is an exemplary arrangement of an integrated gaming piece oriented on a computing device which is executing an accompanying game; in accordance with an implementation of the present application.

FIG. 4 depicts an example gaming apparatus 200 that includes a figurine 210 in accordance with an implementation of the present application. In particular, FIG. 4 illustrates an exemplary arrangement of an integrated gaming piece oriented on a computing device which is executing an accompanying game. As shown in FIG. 4, the gaming piece 200 can be positioned on computing device 105 (shown as a smartphone) and on top of a camera, such as the front-facing camera of the smartphone. In doing so, the front-facing camera of the smartphone can perceive code 225 through lens 240, and can further process the code to determine one or more informational elements (e.g., gameplay instructions) based on a reading of the code. Instructions can correspond to various events or operations occurring with respect to a virtual or video game, such as a game executing or otherwise being played on/with respect to device 105 and reflected, for example, on the display/screen of the device, as shown in FIG. 4, and/or other devices 115-135.

In certain implementations, gaming apparatus 200 shown in FIG. 4 can include and/or be configured to attach or affix to a clip (not shown) or any other such means that can serve to maintain the position of the gaming piece 200 at a particular location/orientation with respect to device 105. This enables code 225 to remain within view of an integrated camera (such as a front-facing camera) of the device 105, including over the course of a game when device 105 can move about during gameplay. Alternatively (or in addition), gaming piece 200 can be affixed to device 105 using suction, for example, using a suction cup placed on any number of surfaces of the device. Moreover, in certain implementations, a clip (and/or suction cup) while securing the gaming piece 200 to a particular location on the surface of a device 105 (such as directly above an integrated camera) enables movement, such as rotation, within the particular location to which the gaming piece is secured, such as in the manner shown and described in detail herein.

By way of further illustration, in certain implementations a particular code 225 can correspond to an 'attack' or 'fire' command within a particular game, while a particular parameter (e.g., a particular color surrounding the code) corresponds to the weapon within the game that is to be used to perform the particular command. Accordingly, having processed such a code 225 and identified such a command, the actual command can be activated, for example, by a user by turning or moving the gaming apparatus 200 or a portion thereof, such as by rotating a portion (not shown in FIG. 4).

Figure 5A:
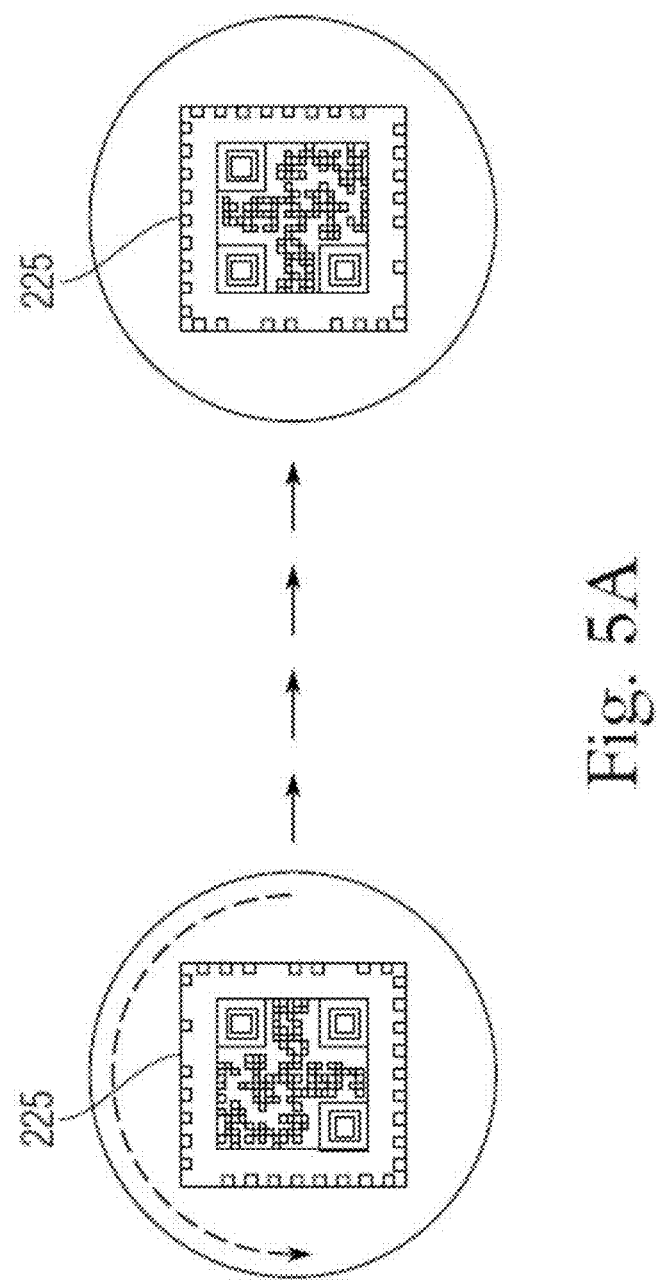
FIG. 5A is an exemplary illustration of a counterclockwise rotation of a code, in accordance with an implementation of the present application.

FIG. 5A depicts a rotation of code 225 (reflecting a counterclockwise rotation of the code, as perceived by camera 145). For example, such a rotation can correspond to the activation of the particular gameplay attack or action associated with code 225. Of course, one skilled in the art will recognize that such gestures or movements are merely exemplary, and virtually any number of other gestures are supported by the present application. For example, a corresponding clockwise rotation can correspond to the use of a shield.

Figure 5B:
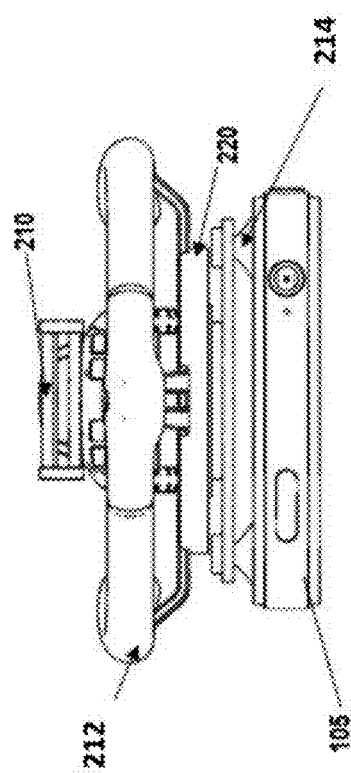

FIGS. 5B-5D depict various aspects of implementations of the present application that support rotation of code 225. In the examples shown in FIGS. 5B-5D, figurine 210 is shaped as a race car affixed to a steering wheel, and having one or more codes (not shown) affixed to the respective underside. Steering wheel 212 can enable the rotation of figurine 210 and the corresponding underlying code(s), thereby affecting perception by the integrated camera of device 105. In doing so, a user can control (e.g., steer) a virtual car, character, or the like within a video game by rotating steering wheel 212 and thereby rotating the code affixed to the figurine 210 to be perceived by the device 105. This enables particular instructions to be provided in connection with the code, and such instructions can correspond, for example, to specific or unique car(s) which can have unique characteristics or abilities within a video game, such as a game executing at device 105.

By inserting/attaching such figurines 210 into base 220, respective codes on the underside of the figurines can be perceived through the integrated camera of device 105, such as through a lens, to correspond to different players.

Thus, in one or more implementations of the present application and with reference to FIGS. 5B-5D, a plurality of respective race cards can be provided, each with a respectively unique code. The cars (figurines 210) can be attached and detached from steering wheel 212, thereby providing for multi-player gaming. The respective codes can be perceived through one or more lenses by a camera that is integrated in a base and, for example, different perceptions can result in increased speed, various handling ability, etc. For example, one kind of car performs well, while another kind does not. The gaming piece can be attached by suction cup 214 and remain stationary with respect to the base and within view of the camera. As shown and described with reference to FIGS. 5B-5D, the base can be configured as a steering wheel 212, with the figurine 210 detachably mounted thereto.

In certain implementations the positioning/orientation of code 225 can be configured or calibrated with the position/orientation of figurine 210. For example, figurine 210 shown in FIG. 2A (having a gun pointing in a particular direction) can be configured/calibrated with particular aspects of code 225, such that aspects (e.g., the direction) of a 'fire' command can be perceived based on the particular position of the code 225 as perceived by camera 145. This provides a gamepiece that is calibrated with the orientation of figurine 210 and thus can correspond to a 'real world' representation of the gameplay. In the examples shown in FIGS. 5B-5D, gaming piece 200 can be affixed to a surface of device 105 using one or more suction cups 214 positioned at the bottom of the gaming piece. In doing so, gaming piece 200 can remain stationary with respect to device 105, such as while a game is being played, with code 225 in ongoing view of an integrated camera of the device.

Figure 6A:
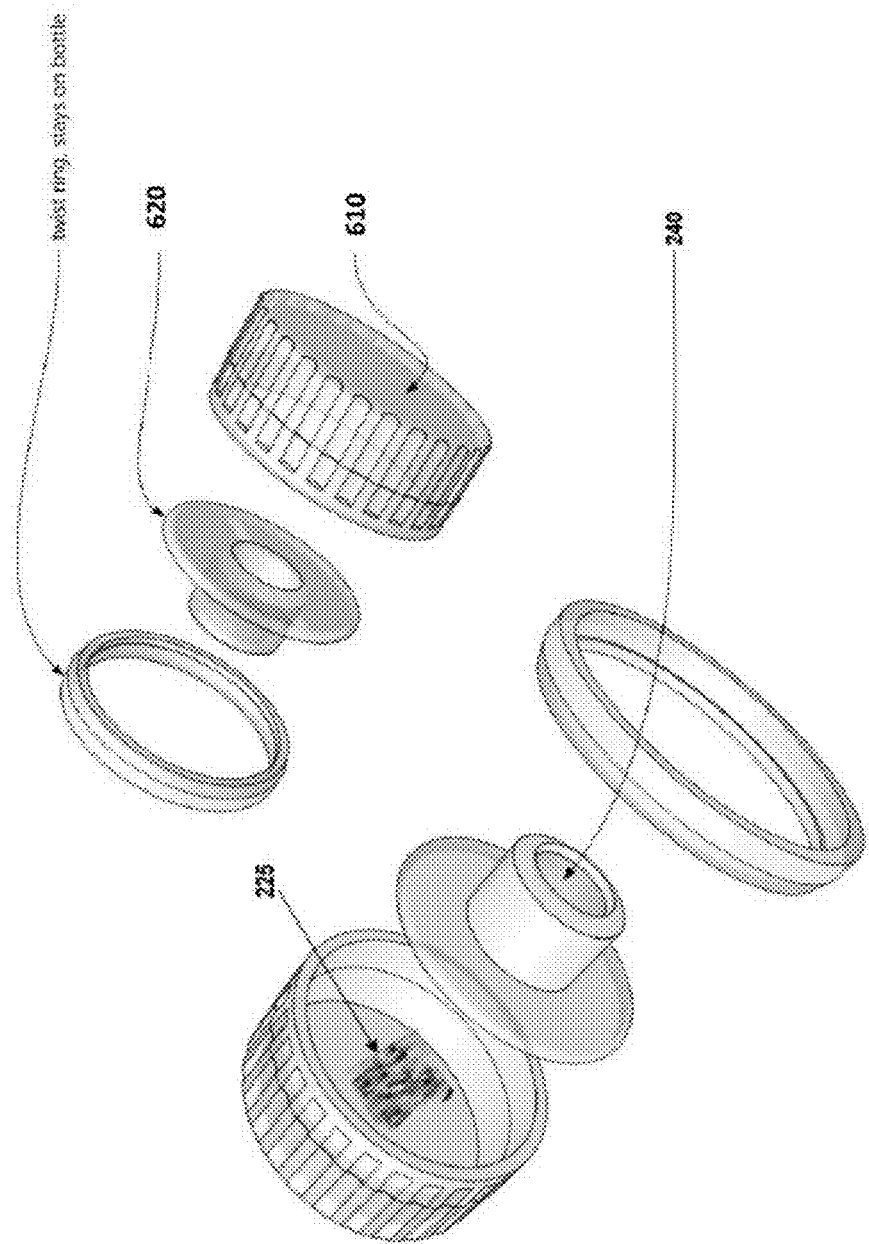
FIG. 6A is an exploded view showing an alternate implementation of an integrated gaming piece configured as a bottlecap.
Figure 6B:
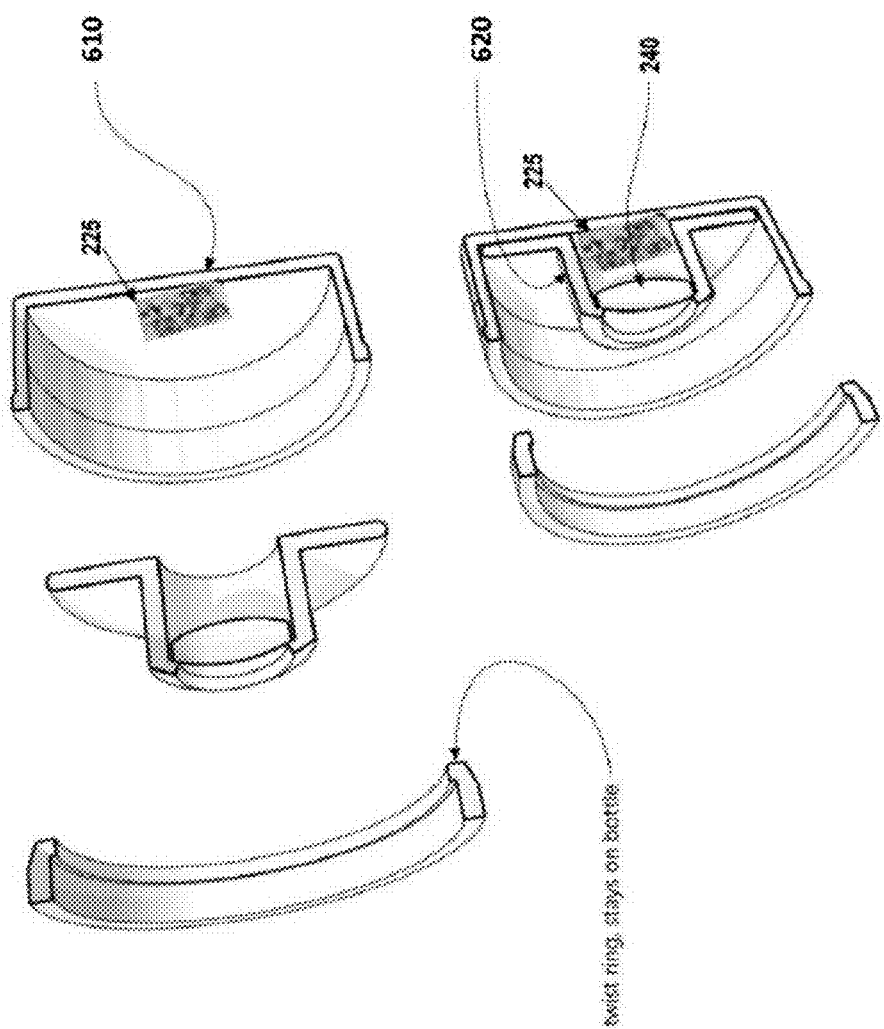
FIG. 6B depicts bisected/exploded views of various elements depicted in FIG. 6A.

Referring now to FIGS. 6A-6G, in one or more implementations of the present application, the code 225 can be configured with or coupled on the underside of a bottle cap 610. Additionally, in certain implementations the referenced code 225 can be applied or positioned on the underside of a bottle-cap 610 not having an attached or associated gaming piece. FIG. 6A depicts an exploded view of such a bottlecap 610. Such an implementation can be employed, for example, in context of a promotion conducted by a soft drink producer, whereby code 225 can correspond to various prizes, points, etc., that can be registered, claimed, or the like, by bringing the cap in close proximity to/in contact with an imaging device (e.g., a camera integrated within a smartphone) such that the code 225, as viewed through lens 240, can be perceived by camera (e.g., camera 145 of device 105, as shown in FIG. 4) and identified/registered using one or more applications or 'apps.' Code 225 can be perceived in different ways through the use of different lenses 240, such as through the use of different attachments 620 which incorporate lenses 240 having different shapes, colors, etc., as described herein. FIG. 6B depicts bisected/exploded views of various elements depicted in FIG. 6A and described herein.

Thus, the bottle cap 610 can be coupled to an attachment that includes a lens/platform. The figurine 210 can be affixed to the top of the bottle cap 610. In such implementations, a reference code 225 can be provided that does not include an attached or associated game piece 210. When the code 225 is perceived with an imaging device (e.g., camera included with a smartphone), and in connection with one or more lenses/colors etc. that affect perception, various actions/applications can be invoked.

Figure 6C:
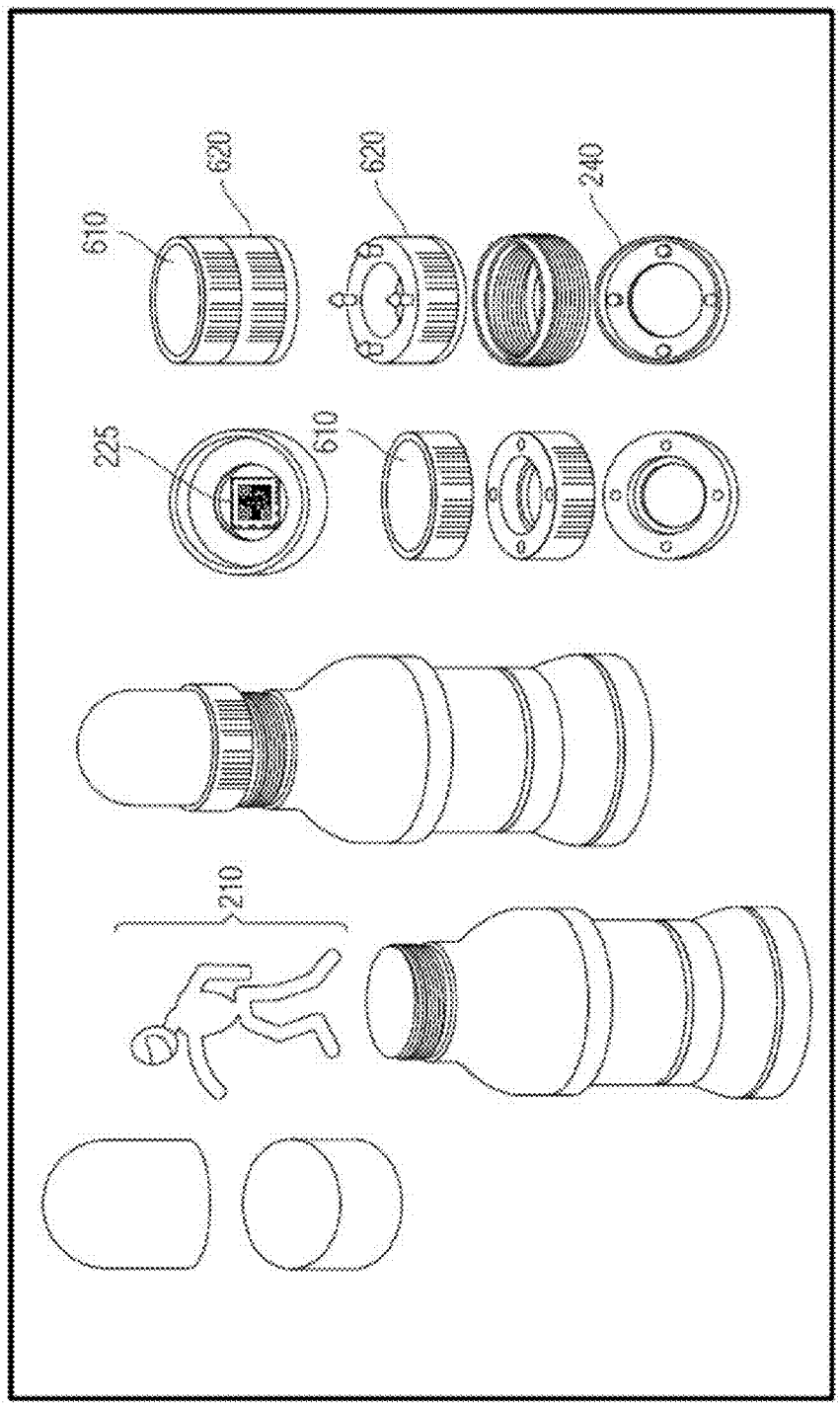
FIG. 6C depicts various aspects of alternative implementations of gaming piece in accordance with the implementations shown in FIGS. 6A and 6B.

Moreover, FIG. 6C depicts an exploded view of an implementation of the present application various aspects of alternative implementations of gaming piece 200 as described herein. As shown in FIG. 6C, code 225 can be applied or positioned on the underside of a bottlecap 610. Such a bottle-cap 610 can be configured to be connected or attached to an attachment such as attachment 620 as shown in FIG. 6C, which can incorporate a lens 240 and otherwise function as a platform as described elsewhere herein. A figurine 210 (which can be covered by a cover, as shown) can be affixed to the top side of bottlecap 610, as shown.

Figure 6D:
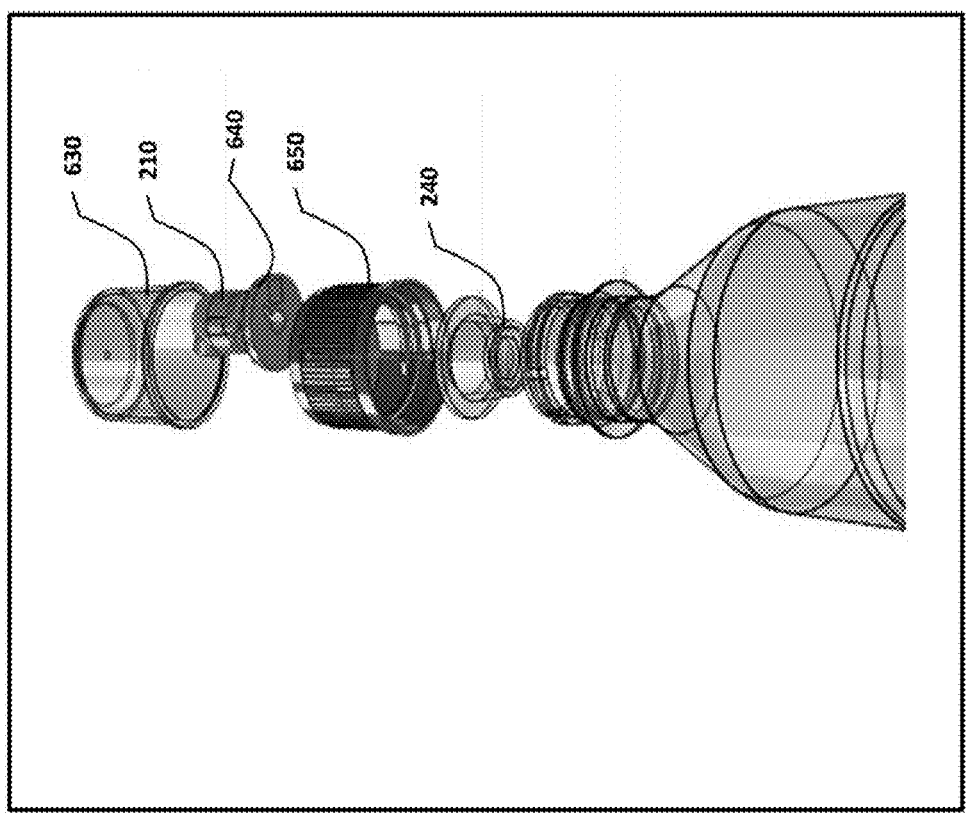
FIGS. 6D-6G illustrate alternative implementations of the present application.
Figure 6E:
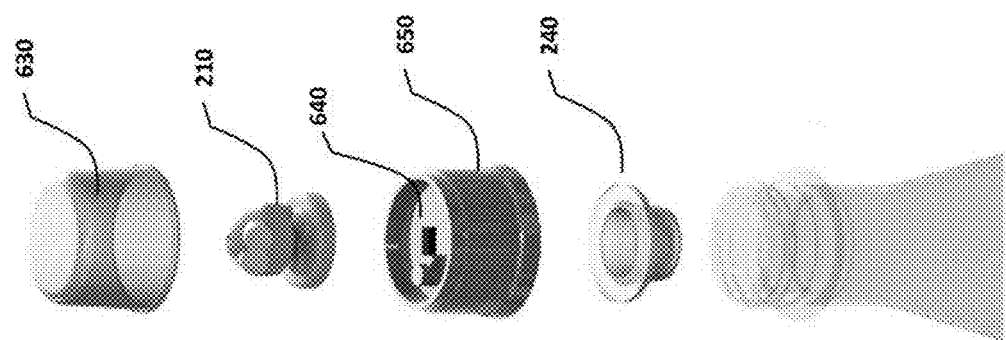

FIGS. 6D and 6E depict an exploded view of an implementation of the present application that includes a lens 240 and a separate cap 650. In the implementation shown in FIGS. 6D and 6E, an overcap 630 is provided that serves as a cover portion to a bottle cap and that may be formed of one or more of a clear, transparent and/or translucent material having a quality allowing light to pass through. Overcap 630 and may be, for example, injection-molded and configured to attach to a bottle cap, such as by a compression-fit, snap-on, threaded member or other suitable format. Alternatively, overcap may be formed in other ways, such as by 3D printing. Also illustrated in FIGS. 6D and 6E is game piece 210, which may be an injection-molded (or formed in other ways, such as by 3D printing) character and formatted with a recess and/or locking hole, which can provide access to code 225 and secure game piece 210, respectively, for corresponding functionality shown and described herein. Further, a game piece platform 640 is illustrated in FIGS. 6D and 6E that may be opaque, is configured to hold a character and/or game piece 210 suitably over a lens 240, such as to be centered over the lens 240. Continuing with reference to FIGS. 6D and 6E, a cap 650 is provided that may be a clear or translucent injection-molded (or formed in other ways) and be configured with threads or other suitable way to securely couple to a bottle. In one or more implementations, the cap 650 may include a snap ring to detect tampering, and may be configured to include an interior pressure ring seal (not shown).

Figure 6F:
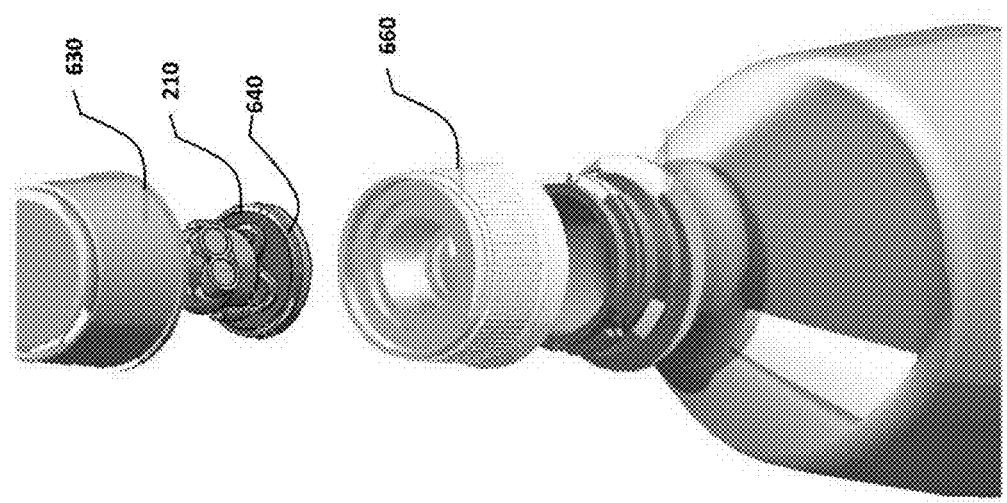
Figure 6G:
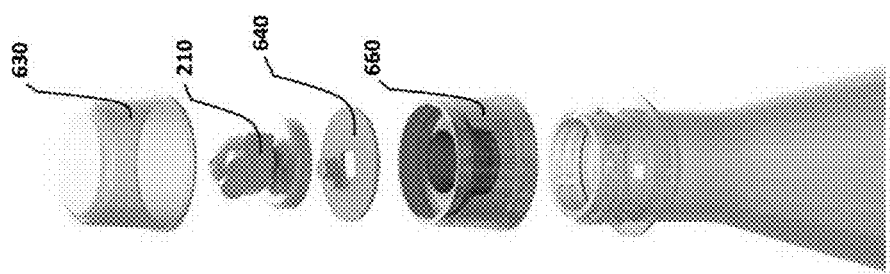

FIGS. 6F and 6G illustrate an exploded view of an alternative implementation of the present application, that includes a cap 660 with integral lens. Cap 660 can be configured with threads or in other suitable ways for secure coupling to a bottle. In the example shown in FIGS. 6F and 6G, game piece 210 that is configured with a recess and/or locking hole, which can provide access to code 225 (not shown). Cap 660 includes an integral lens and may include a rim portion for receiving game piece platform 240. Alternatively, cap 660 can be formed with an integral game piece platform 240. Furthermore and as in other implementations, cap 660 can be threaded or configured in one or more other suitable ways for securely coupling to a bottle. In one or more implementations, the cap 660 may include a snap ring to detect tampering, and may be configured to include an interior pressure ring seal (not shown).

Thus, as shown and described herein, in certain implementations various systems and/or methods can enable the processing of various informational elements (e.g., instructions) that can be determined based on one or more codes 225 that are incorporated within gaming pieces 200. In doing so, such informational elements can be processed to reflect various instructions, changes, results, actions, etc., that pertain to virtual/video games, such as one or more games executing or otherwise being played on/with respect to device 105. Accordingly, also described herein are systems and methods that enable the processing of such codes and the implementation of various instructions reflected by the codes in relation to a virtual/video game. Real world gameplay actions (such as gameplay actions occurring with respect to a 'real world' gaming piece 200) can also influence/affect aspects of virtual/video gameplay, as described herein.

Figure 7:
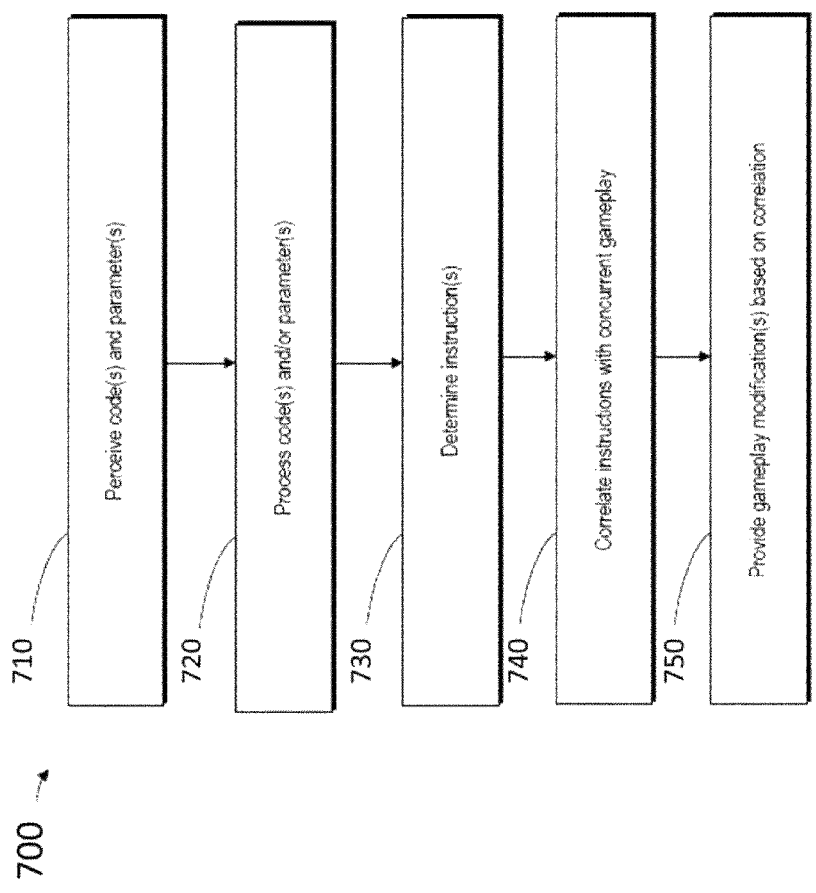
FIG. 7 is a flow diagram showing a routine that illustrates a broad aspect of a method for processing code(s) in accordance with at least one implementation disclosed herein.

Turning now to FIG. 7, a flow diagram is described showing a routine 700 that illustrates a broad aspect of a method for processing code(s) in accordance with at least one embodiment disclosed herein. Several of the logical operations described herein are implemented (1) as a sequence of computer implemented acts or program modules running on code processing system 100 and/or (2) as interconnected machine logic circuits or circuit modules within the code processing system 100. The implementation is a matter of choice dependent on the requirements of the device (e.g., size, energy, consumption, performance, etc.). Accordingly, the logical operations described herein are referred to variously as operations, steps, structural devices, acts, or modules. Various of these operations, steps, structural devices, acts and modules can be implemented in software, in firmware, in special purpose digital logic, and any combination thereof. Furthermore, more or fewer operations can be performed than shown in the figures and described herein. These operations can also be performed in a different order than those described herein.

Continuing with reference to FIG. 7, at 710, processor 110 executing one or more of software modules 130, including, in certain implementations, code processing application 170, configures computing device 105 to perceive one or more codes. For example, gaming piece 200 can be positioned directly upon camera 145 of computing device 105 (e.g., a smartphone). When gaming piece 200 is so oriented, camera 145 can perceive a code, such as code 225 which is embedded within the gaming piece as described herein. Moreover, as described above, such a code can be perceived through a lens attached to the gaming piece 200 and/or the computing device 105, which can affect the manner in which code 225 can be perceived by camera 145, as noted above. Thus, for example, with respect to a video game executing on device 105, one lens (corresponding to a particular gameplay ability or characteristic) can magnify or otherwise distort a particular code 225 such that the code is perceived in one way by camera 145, while another lens (corresponding to another gameplay ability or characteristic) can distort the same code 225 such that the code is perceived in another way by camera 145. In doing so, the same code 225 can be perceived by camera 145 in different ways under different circumstances.

Moreover, in certain implementations, various parameters can also be perceived. Such parameters can reflect aspects of the manner in which the code 225 is perceived by camera 145. For example, aspects of platform 230 can affect the manner in which code 225 is perceived by camera 145. As noted above, platform 230 can be constructed of material having varying degrees of translucency, and/or different colors. Such factors can also affect the manner in which a particular code 225 is perceived by camera 145. Thus, for example, a code perceived in conjunction with one color (based on the color of the translucent material of platform 230) can be associated with one instruction, while the same code when perceived in conjunction with another color (based on the color of the translucent material of platform 230) can be associated with another instruction.

Continuing with reference to FIG. 7, at 720, processor 110 executing one or more of software modules 130, including, in certain implementations, code processing application 170, configures computing device 105 to process the code and/or the parameters, such as the code/parameters perceived at 710. That is, in certain implementations a particular code 225 (such as a QR code or bar code) can reflect or otherwise correspond to one or more instructions. For example, such instructions can be reflected in various aspects of the code itself, as is known to those or ordinary skill in the art. By way of further example, code 225 can correspond to a unique value or identifier which, in turn, can be used to retrieve or identify an actual instruction, etc. Moreover, the referenced parameters (e.g., colors or other such aspects relating to the code that are perceptible by camera 145) can be similarly processed.

For example, a user places gaming piece 200 onto camera 145 of computing device 105. Computing device 105 is executing a video game which the user can play using any number of characters or personas (each of which have different attributes such as abilities, powers, weaknesses, etc.). The character that the user is presently playing the game as is reflected in the upper left-hand corner of the display of device 105, together with various gauges or meters (reflecting, for example, the amount of health, ammunition, special power, etc., that the particular character has at that point in the game, and/or the various attributes that the character has.

Continuing with reference to FIG. 7, at 730, processor 110 executing one or more of software modules 130, including, in certain implementations, code processing application 170, configures computing device 105 to determine one or more instructions. For example, such instructions can be determined based on the code and/or the parameters processed at 720. That is, having processed such code(s) and/or parameter(s), one or more corresponding instructions, such as instructions pertaining to one or more operations or actions within a virtual or video game, can be determined.

By way of illustration, upon placing gaming piece 200 onto camera 145 of computing device 105 (as described above), one character (e.g. the character the user is presently playing the game with, such as a default character) can be substituted for another (e.g., a character corresponding to/reflected in the gaming piece 200). That is, upon perceiving and processing the code 225 associated with the gaming piece, a character substitution (to the character reflected in the gaming piece 200 that was placed upon the camera of the computing device) can be made in the game. Accordingly, a user playing the same game can be playing as the character reflected in the gaming piece 200 (as can be appreciated with reference to the upper left-hand corner of the display of device 105.

Continuing with reference to FIG. 7, at 740, processor 110 executing one or more of software modules 130, including, in certain implementations, code processing application 170, configures computing device 105 to correlate one or more instructions (such as those determined at 730) with one or more concurrent gameplay events. For example, having determined (such as based on the perception/processing of a code and/or various gestures/movements of such a code, as described at 730), that a particular command has been provided, such an instruction can be further correlated with other gameplay aspects that occur concurrently (or otherwise in proximity to) the providing of the instruction. For example, such instructions (e.g., a 'fire' or 'attack' command) provided by one user can be correlated with gameplay aspects such as the position of a player (corresponding the user) within a virtual or video game and the various positions of other players within the game (as well as various additional characteristics of such players, e.g., protection, armor, special powers/abilities, etc.).

Moreover, in certain implementations, one or more devices (e.g., any/all of devices 105, 115, 125, 135, etc.) can communicate directly/indirectly and/or otherwise perceive the presence of one another (using, Wi-Fi, Bluetooth, etc.), as can be appreciated by those of ordinary skill in the art. Accordingly, each respective device can, in various implementations, determine the respective proximities/positions of other devices. In doing so, various instructions (e.g., an 'attack' command) can be correlated with such proximities/positions. For example, a 'fire' instruction in a particular direction can be processed to 'hit' a device/player in closer proximity, and thus not hit a device/player that is not as proximate.

Continuing with reference to FIG. 7, at 750, processor 110 executing one or more of software modules 130, including, in certain implementations, code processing application 170, configures computing device 105 to provide one or more gameplay modifications based on a correlation of one or more instructions with one or more concurrent gameplay events (such as in the manner described at 770). For example, having correlated a particular instruction (e.g., an 'attack' command) with a concurrent gameplay event (e.g., a position of an enemy within the game), a gameplay modification can be provided. Examples of such a gameplay modification can include, but are not limited to, a change in the status or health of a player (reflecting, for example, a 'hit' or other such damage resulting from the correlation), a change in one or more aspects of the gameplay (e.g., a change to various gameplay parameters occurring based on the correlation, etc.

In various implementations, a particular character, feature, etc., (as reflected code 225) can be associated with a particular user account, such as a user profile in a multi-player gaming network. Moreover, such as code can be associated with a particular user device 105. As such, in certain implementations, such a code can be processed (or processed in a certain way) only when perceived at the particular device and/or in relation to a particular user account (such as at a device that is 'signed in' to the particular account). In doing so, additional security can be provided in relation to particular gaming pieces 200, such that the pieces are only operable when used by their rightful owner.

Although much of the foregoing description has been directed to systems and methods for code processing, the systems and methods disclosed herein can be similarly deployed and/or implemented in scenarios, situations, and settings far beyond the illustrated scenarios. It can be readily appreciated that code processing system 100 can be effectively employed in practically any scenario where code processing can be useful. For example, while many of the foregoing examples and illustrations pertain to implementations that relate to virtual/video gaming, the various technologies described herein can be implemented in any number of other settings and circumstances. By way of illustration, the apparatus, methods, and systems described herein can be implemented in a setting whereby a service provider, such as a doctor, pharmacy, insurance company, etc., can provide an item having a code to a user (e.g., a patient, customer, etc.), and such code can be perceived by a device (using a viewer such as the platform/base/lens apparatus described herein) in order to access information pertaining to the user, such as in a manner known to those of ordinary skill in the art. It should be noted, however, that in scenarios where the information being accessed is personal and/or sensitive, any number of verifications can be required (e.g., inputting a unique user ID/password) in order to ensure that only the intended recipient of the code is capable of viewing the embedded/associated information. Moreover, as described above, depending on the specifications of the particular lens and/or translucent platform through which the code is perceived by the computing device, varying degrees of access can be provided (for example, different lenses/colors can correspond to different roles, e.g., doctor, patient, nurse, pharmacist, etc., each being provided different types/degrees of access to information embedded within/associated with a particular code). It should also be noted that though much of the foregoing description and examples have been provided with respect to various codes (e.g., QR codes, etc.), any number of other methods can be similarly implemented (e.g., Bluetooth, NFC, Wi-Fi, or the likeOu) in order to provide identifying information to a device, as can be appreciated by those of ordinary skill in the art. It should be further understood that any such implementation(s) and/or deployment(s) are within the scope of the systems and methods described herein.

It is to be understood that like numerals in the drawings represent like elements through the several figures, and that not all components and/or steps described and illustrated with reference to the figures are required for all embodiments or arrangements. It should also be understood that the embodiments, implementations, and/or arrangements of the systems and methods disclosed herein can be incorporated as a software algorithm, application, program, module, or code residing in hardware, firmware and/or on a computer useable medium (including software modules and browser plug-ins) that can be executed in a processor of a computer system or a computing device to configure the processor and/or other elements to perform the functions and/or operations described herein. It should be appreciated that according to at least one embodiment, one or more computer programs, modules, and/or applications that when executed perform methods of the present invention need not reside on a single computer or processor, but can be distributed in a modular fashion amongst a number of different computers or processors to implement various aspects of the systems and methods disclosed herein.

Thus, illustrative embodiments and arrangements of the present systems and methods provide a computer implemented method, computer system, and computer program product for processing code(s). The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. An apparatus for providing information to a camera associated with a computing device, the apparatus comprising:
   a base portion having at least a bottomside and an interior region disposed within the base portion and providing an illuminable surface;
   a machine-readable code supported by the surface; and
   a lens disposed between the machine-readable code and the bottomside,
   the base being configured to seat the lens over the camera associated with the computing device;
   wherein the machine-readable code presents, for reading by the computing device, first information in response to the lens being seated over the camera, and the machine-readable code or the lens provided in a respective first orientation, and the machine-readable code also presents second information in response to the lens being seated over the camera, and the machine-readable code or the lens provided in a respective second orientation.

2. The apparatus of claim 1, further comprising a second lens positioned between the code and the bottomside of the base portion, the base being configured to seat the second lens over the camera associated with the computing device, and
wherein the machine-readable code presents for reading by the computing device third information in response to the second lens being seated over the camera.

3. The apparatus of claim 2, wherein the lens is convex and the second lens is concave.

4. The apparatus of claim 2, wherein the base portion comprises removable and replaceable attachment of the second lens.

5. The apparatus of claim 1, further comprising a signal projector for projecting a signal corresponding to the code.

6. The apparatus of claim 1, further comprising:
a platform associated with the base portion; and
a figurine coupled to the platform, wherein at least one of the first information and second information is associated with the figurine.

7. The apparatus of claim 6, wherein the figurine is a character in a game.

8. The apparatus of claim 1, wherein the first information or the second information represents an instruction associated with playing a game.

9. The apparatus of claim 1, wherein the base portion is configured in a plurality of colors, and wherein a first of the plurality of colors is received by the lens in response to the lens being seated over the camera, and the machine-readable code or the lens being provided in a respective orientation, and a second of the plurality of colors is received by the lens in response to the lens being seated over the camera, and the machine-readable code or the lens being provided in a respective different orientation.

10. The apparatus of claim 1, wherein at least a section of the base portion is translucent or transparent.

11. The apparatus of claim 1, wherein the surface comprises a rotatable mount to rotatably support the machine-readable code relative to the base portion.

12. The apparatus of claim 1, further comprising a suction cup or a clip to couple the base portion to the computing device.

13. The apparatus of claim 1, wherein the base portion is configured in the shape of a bottle cap.

14. The apparatus of claim 1, wherein the base portion interior regions receives light from exterior of the base portion.

15. A code processing method, comprising:
reading at least one first information element, via a camera provided with a computing device, from a code through a lens with the lens or the at least one first information element oriented in a respective first position provided with an apparatus;
processing, by the computing device, the at least one first information element associated with the code to determine at least one first instruction associated with a software application configured to run on the computing device;
executing, by the computing device, the at least one first instruction associated with the application to affect the operation of the application;
displaying, by the computing device, the operation of the application as affected by the at least one first instruction;
reading at least one second information element, via the camera provided with the computing device, from the code through the lens with the lens or the at least one second information element oriented in a respective second position;
processing, by the computing device, the at least one second information element associated with the code to determine at least one second instruction associated with the application configured to run on the computing device;
executing, by the computing device, the at least one second instruction associated with the application to affect the operation of the application; and
displaying, by the computing device, the operation of the application as affected by the at least one second instruction.

16. The method of claim 15, further comprising reading at least one third information element, via the camera, from the code through at least one other lens provided with the apparatus.

17. The method of claim 16, wherein the lens is convex and the at least one other lens is concave.

18. The method of claim 15, wherein the apparatus is configured with a base portion that comprises a platform.

19. The method of claim 15, wherein the application is a multi-player game, and further comprising determining, as a function of the at least one first information element or the at least one second information element, at least one player in the multi-player game.

20. The method of claim 19, wherein the determining the at least one player is in accordance with information stored in profile.

21. The method of claim 15, wherein the at least one first information element and the at least one second information element are the same.

22. An apparatus for providing information to a camera associated with a computing device, the apparatus comprising:
a base portion having at least a bottomside and an interior region disposed within the base portion and providing an illuminable surface;
a machine-readable code supported by the surface; and
a lens disposed between the machine-readable code and the bottomside,
the base being configured to seat the lens over the camera associated with the computing device;
wherein the machine-readable code presents, for reading by the computing device, particular information in response to:
the lens permitting light to illuminate at least some of the bottomside of the base portion;
the lens being seated over the camera; and
the machine-readable code or the lens being provided in a respective orientation.

* * * * *